Aug. 13, 1929.  J. W. COX  1,724,455
FURNACE
Filed Dec. 12, 1924
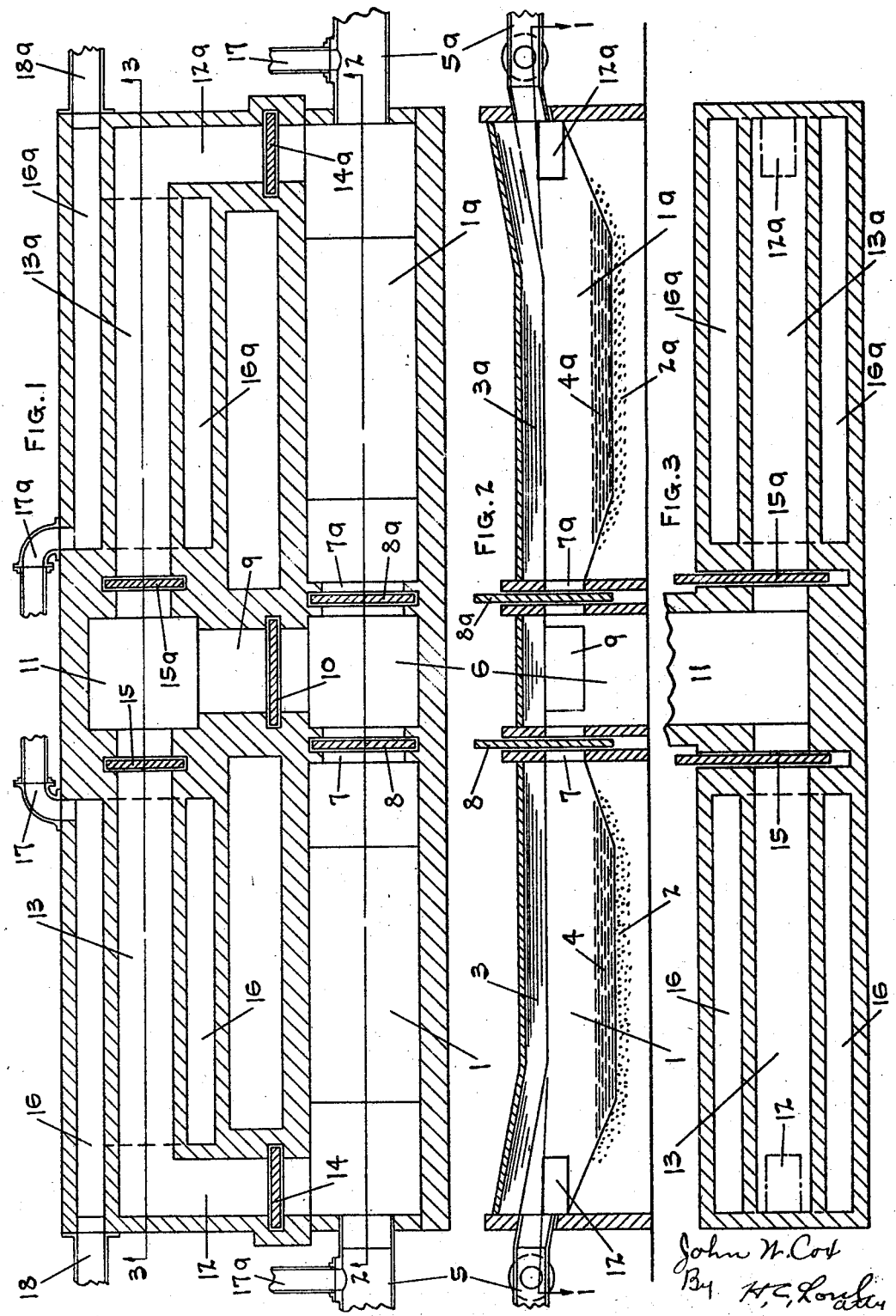

Patented Aug. 13, 1929.

1,724,455

UNITED STATES PATENT OFFICE.

JOHN WILLIAM COX, OF ERIE, PENNSYLVANIA, ASSIGNOR OF ONE-FOURTH TO GEORGE R. METCALF AND ONE-FOURTH TO EDWARD E. WALKER, BOTH OF ERIE, PENNSYLVANIA.

FURNACE.

Application filed December 12, 1924. Serial No. 755,395.

This invention is designed to improve furnaces, increasing their efficiency as to capacity and fuel consumption. In carrying out the invention I preferably provide two furnace chambers and carry the waste gases from one chamber through the other of said chambers, preferably reversing this process as the chambers are charged and poured alternately. In this way the waste gases of one furnace may be used to heat the charge of the other furnace so that the furnace so heated may be readily brought to a melting temperature when the fuel is directly introduced to said furnace. I also preferably arrange this so that this control of the gases may be accomplished without undue interruption of the operation of the furnace. I also prefer to heat the air going to the furnaces, alternating this air as the furnaces are alternated. Other features and details of the invention will appear from the specification and claims.

A preferred embodiment of the invention is illustrated in the accompanying drawings as follows:—

Fig. 1 shows a horizontal section of the furnace on the line 1—1 in Fig. 2.

Fig. 2 a section on the line 2—2 in Fig. 1.

Fig. 3 a section on the line 3—3 in Fig. 1.

1 marks one of the furnace chambers, $1^a$ the companion furnace chamber, 2 the hearth of one chamber, $2^a$ the hearth in the companion chamber, 3 the arch in one chamber, $3^a$ the arch in the companion chamber, 4 the charge as indicated in one chamber, $4^a$ the charge indicated in the companion chamber, 5 a tube for introducing powdered or other fuel to one chamber, and $5^a$ a tube for introducing fuel to the companion chamber. Both chambers discharge their gases to a communicating chamber 6 through openings, the chamber 1 through the opening 7 and the chamber $1^a$ through an opening $7^a$, these openings being controlled by valves or gates 8 and $8^a$ respectively. The chamber 6 opens to a passage 9, the communication being controlled by a gate 10 and the passage 9 leads to a stack 11 which in the preferred construction and as shown forms a common stack for both furnaces. A passage 12 leads laterally from the chamber 1 and at the fuel inlet end of the chamber and a similar passage $12^a$ leads from the chamber $1^a$. The passages 12 and $12^a$ lead to the longitudinal flues or passages 13 and $13^a$ respectively and the passages 13 and $13^a$ discharge into the stack 11. The passages 12 and $12^a$ are controlled by gates 14 and $14^a$ adjacent to the furnace chambers and the passages 13 and $13^a$ by gates 15 and $15^a$ adjacent to the stack.

In operation assuming that the charge in the chamber 1 is being subjected to the action of fuel introduced through the tube 5 and has reached practically the melting stage and that the chamber $1^a$ has just been charged. The gates 10, 14 and 15 are closed and the gates 8, $8^a$, $14^a$ and $15^a$ are opened. The furnace 1 is, therefore, subjected to the action of the fuel. The waste gases are carried through the chamber $1^a$ and discharged by way of the passages $12^a$ and $13^a$ to the stack 11. After the metal is drawn from the furnace 1 and during re-charging of this furnace the gates 8 and $14^a$ 15—$15^a$ are closed and the gates $8^a$ and 10 opened. Fuel is then introduced through the tube $5^a$ and the melting of the charge in the furnace $1^a$ proceeded with. As soon as the chamber 1 has been re-charged the gates 8, 14 and 15 are opened and the gate 10 is closed. The operation of the furnace then proceeds as I have heretofore described with relation to the chamber 1, that is to say, the chamber $1^a$ is subjected to the direct action of the fuel, the waste gases passing from the chamber 1 and by way of the passages 12 and 13 to the stack.

It is desirable to utilize the waste heat of the gases around the passages through which these gases are carried and, I, therefore, provide passages 16 and $16^a$ along the walls of said passages. The passage 16 is connected by a tube 17 with the fuel inlet tube $5^a$ and the passage $16^a$ by a tube $17^a$ with the fuel inlet tube 5. When, therefore, the waste gases are passing through the passages 12 and 13 the air heated in the passage 16 is conveyed to the inlet tube $5^a$ and when the waste gases are passing through the passages $12^a$ and $13^a$ the air heated in the passage $16^a$ is communicated by the tube $17^a$ to the tube 5. The air is admitted to the passages 16 and $16^a$ by pipes 18 and $18^a$ which lead to a pressure supply so as to create a movement of air through these passages.

What I claim as new is:—

1. In a furnace, the combination of two furnace chambers having melting hearths; means for introducing fuel to each of said chambers over their charges; a single common stack communicating with said chambers; and control devices permitting the passing of waste gases alternately from one chamber to the other and then to the stack, or directly to the stack.

2. In a furnace, the combination of two chambers arranged end to end; means for introducing fuel at the outer ends of said chambers; a stack; passages leading from the outer ends of said chambers to the stack; means of communication between the inner ends of said chambers and between the inner ends of said chambers and the stack; and controlling gates permitting the opening or closing of each of said passages.

3. In a furnace, the combination of two furnace chambers having melting hearths; means for introducing fuel to each of said furnaces over their charges and alternately; means for carrying the waste gases from each of said furnace chambers through the other with an entrance to a second chamber opposite its means for introducing fuel; a single common stack receiving waste gases from both ends of each furnace; and devices for closing off said means and providing a direct connection to the stack to permit the alternate charging of said furnaces.

In testimony whereof I have hereunto set my hand.

JOHN WILLIAM COX.